United States Patent [19]
Sherman

[11] Patent Number: 5,508,491
[45] Date of Patent: Apr. 16, 1996

[54] ELECTRONIC MASS AIRFLOW SENSOR CIRCUIT AND METHOD FOR MANUFACTURING SAME

[75] Inventor: James M. Sherman, Farmington Hills, Mich.

[73] Assignee: Ford Motor Company, Dearborn, Mich.

[21] Appl. No.: 930,054

[22] Filed: Aug. 14, 1992

[51] Int. Cl.$^6$ .................................................. B23K 26/00
[52] U.S. Cl. ................................ 219/121.69; 219/121.85; 219/121.83; 73/204.25; 73/204.26; 73/204.15
[58] Field of Search .......................... 219/121.69, 121.68, 219/121.85, 121.83; 73/204.14, 204.26, 861.95, 204.25, 204.15

[56] References Cited

U.S. PATENT DOCUMENTS

| | | | |
|---|---|---|---|
| 4,669,052 | 5/1987 | Bianco | 364/571 |
| 4,735,086 | 4/1988 | Follmer | 73/204 |
| 4,771,271 | 9/1988 | Zanini-Fisher | 340/620 |
| 4,872,339 | 10/1989 | Gerhard et al. | 73/204.14 |
| 5,237,867 | 8/1993 | Cook, Jr. | 73/204.15 |
| 5,243,858 | 9/1993 | Erskine et al. | 73/204.26 |

*Primary Examiner*—Mark H. Paschall
*Attorney, Agent, or Firm*—Roger L. May; Peter Abolins

[57] ABSTRACT

An improved electronic mass airflow sensor circuit and method for manufacturing that circuit are disclosed. The circuit includes primary and secondary sensor elements having non-zero temperature coefficients of resistance. The circuit further includes a thick film resistor electrically connected to the secondary sensor element to form a combination element such that resistance ratio of the primary sensor element to the combination element remains constant over varying temperatures. The method includes the steps of detecting the resistance of the primary and secondary sensor elements, generating primary and secondary electrical signals corresponding thereto, and placing the thick film resistor in electrical contact with the secondary sensor element to form the combination element. The method also includes the steps of processing the primary and secondary electrical signals to determine operating temperatures for the primary sensor element and an optimum resistance for the thick film resistor such that the resistance ratio of the primary sensor element to the combination element remains constant over varying temperatures. The method further includes the step of sizing the thick film resistor in accordance with the optimum resistance determined.

8 Claims, 5 Drawing Sheets

ELECTRONIC MASS AIRFLOW SENSOR CIRCUIT AND METHOD FOR MANUFACTURING SAME

TECHNICAL FIELD

This invention relates generally to an electronic mass airflow sensor circuit and a method for manufacturing that circuit. More specifically, this invention relates to an improved electronic mass airflow sensor circuit and method for manufacturing that circuit to compensate for sensor element deviations in physical characteristics.

BACKGROUND ART

Two goals of increasing importance in the operation of internal combustion engines are the minimization of exhaust emissions and the improvement of fuel efficiency. These goals can be accomplished, in part, by maintaining an optimum air-to-fuel ratio during combustion. Optimization of the air-to-fuel ratio requires careful measurement of air flow to the engine. Such measurement is often accomplished through the use of a mass airflow sensor.

A mass airflow sensor typically comprises a metallic or plastic housing forming a portion of the air flow chamber between the engine air filter and manifold. Electronic circuitry forming the sensor itself is generally housed in a smaller plastic compartment located atop the metallic or plastic housing. The sensor ordinarily has two elements suspended within the housing such that they are exposed to air flowing therethrough. These elements are the most critical components to the proper operation of the mass airflow sensor electronic circuitry.

In order for the sensor to accurately measure air flow, the sensor elements are subject to strict physical requirements. First, the elements must typically have temperature coefficients of resistance (TCR, i.e., the slope of the line plotting the resistance of the element as a function of temperature) within approximately 1% of each other. Second, deviations in resistance ratios of the elements at selected ambient temperatures must be minimized. Depending on the actual design of the sensor circuitry, to properly minimize such resistance ratio deviations, the elements may be required to have resistances between 19.5 and 20.5 ohms at room temperature, and the difference between the resistances of the elements may be required to be less than 0.1 ohm.

These stringent requirements necessitate "matching" of the sensor elements. In the manufacture of prior art sensors, this matching is accomplished by manually sorting pre-tested elements into groups, where each group contains elements having TCR's and resistance meeting the above described requirements. To have properly matched elements, each sensor must then be constructed using only elements from the same group. These strict requirements necessitate high quality control of pre-tested elements for TCR's and resistance values, and labor intensive efforts for sorting of elements. As a result, prior art sensors are typically expensive to manufacture.

U.S. Pat. No. 4,669,052 issued to Bianco discloses an apparatus and method for calibrating a sensor. Prior art mass airflow sensors typically include circuitry to perform gain and offset adjustments to ensure proper sensor function at room temperature versus the sensing medium. This circuitry is generally implemented through the use of laser trimmed thick film resistors. The invention disclosed in the Bianco patent substitutes a logic unit and database unit for such prior art circuitry to perform gain and offset adjustments, thereby eliminating laser trimming of resistors.

However, the logic and database units of the invention disclosed in the Bianco patent are used to calibrate a sensor being actively tested. As a result, these units become part of the sensor and tend to raise variable production costs. Moreover, the invention disclosed in the Bianco patent does not specifically address the above described problems associated with the "matching" requirements for the sensor elements themselves.

The present invention eliminates the stringent "matching" requirements of prior art mass airflow sensors without sacrificing accuracy of air flow measurement. The present invention also provides for improved air flow measurement accuracy. Each element of a sensor may have TCR's that vary by as much as 6%. Moreover, depending on the actual design of the sensor circuitry, each element may have resistances varying from 18 to 22 ohms at room temperature. As a result, stringent quality control requirements and labor intensive sorting of elements are significantly reduced. The present invention thus dramatically reduces mass airflow sensor manufacturing costs.

SUMMARY OF THE INVENTION

Accordingly, the principle object of the present invention is to provide an improved electronic mass airflow sensor circuit and method for manufacturing that circuit that lowers internal combustion engine exhaust emissions and improves fuel efficiency by optimizing the air-to-fuel ratio during combustion.

Another object of the present invention is to provide an improved electronic mass airflow sensor circuit and method for manufacturing that circuit that increases sensor accuracy of air flow measurement.

It is a further object of the present invention to provide an improved electronic mass airflow sensor circuit and method for manufacturing that circuit that is simple and easy to implement.

Still another object of the present invention is to provide an improved electronic mass airflow sensor circuit and method for manufacturing that circuit that reduces production costs.

In accordance with these objects, the present invention provides an improved electronic mass airflow sensor circuit having a balanced resistance ratio. The circuit comprises a primary sensor element in electrical communication with a secondary sensor element. The primary and secondary sensor elements each have non-zero TCR's.

The circuit also comprises a thick film resistor connected in series with the secondary sensor element to form a combination element also having a non-zero TCR. The thick film resistor has a substantially zero TCR and a predetermined resistance value such that the resistance ratio of the primary sensor element to the combination element at a first selected ambient temperature equals the resistance ratio of the primary sensor element to the combination element at a second selected ambient temperature.

Also in accordance with these objects, the present invention provides a method for manufacturing a mass airflow sensor including the steps of detecting the resistance of primary and secondary sensor elements at first and second selected temperatures, and generating primary and secondary electrical signals corresponding thereto. The method also includes the step of placing a thick film resistor in electrical contact with the secondary sensor element to form a combination element.

The method also includes the step of processing the primary and secondary electrical signals to determine operating temperatures for the primary sensor element at first and second selected ambient temperatures such that current through the primary sensor element remains constant for a selected constant volume of air flow. The step of processing the primary and secondary electrical signals also determines an optimum resistance for the thick film resistor such that deviations in the TCR's and ambient resistance ratios of the primary sensor element and the combination element are minimized.

The method further includes the step of sizing the thick film resistor in accordance with the optimum resistance determined for the thick film resistor.

These and other objects, features and advantages of the present invention are readily apparent from the following detailed description of the best mode for carrying out the invention when taken in connection with the accompanying drawings.

DETAILED DESCRIPTION OF THE INVENTION

The Mass Airflow Sensor Circuit

Figure 1:
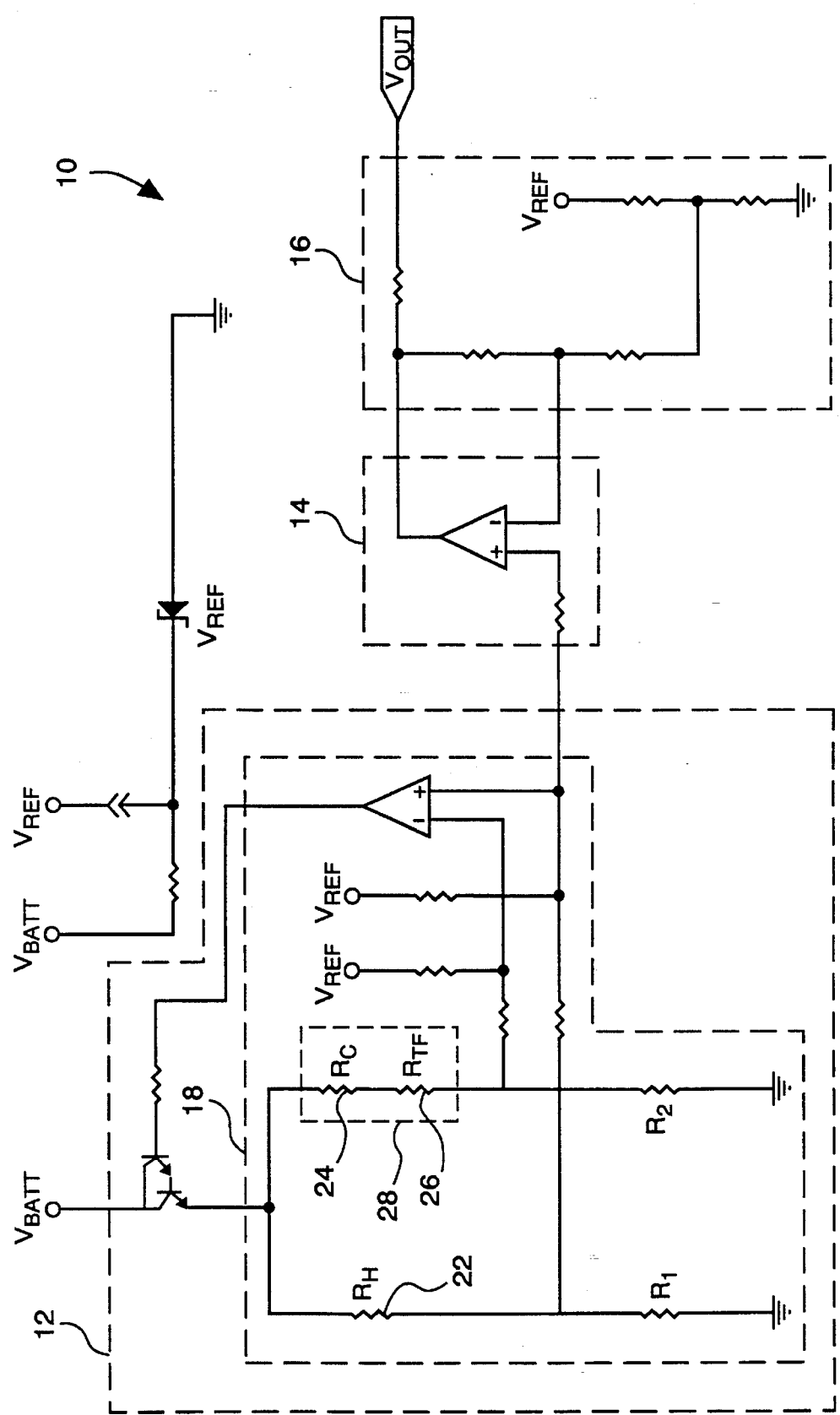
FIG. 1 is a detailed schematic diagram of the electronic mass airflow sensor circuit manufactured of the present invention.
Figure 2:
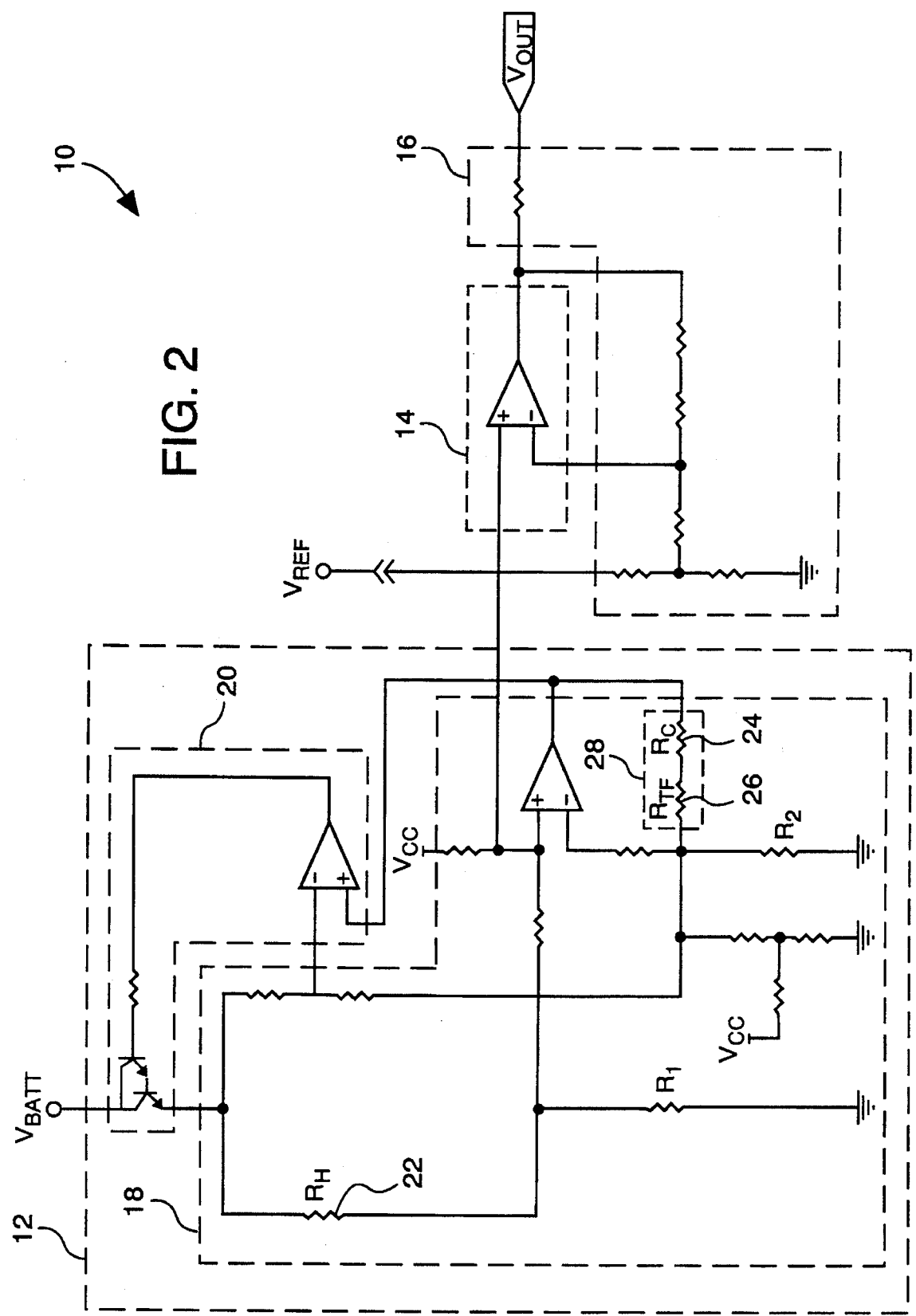
FIG. 2 is a detailed schematic diagram of an alternative electronic mass airflow sensor circuit of the present invention.

Referring to FIGS. 1 and 2, detailed schematic diagrams of alternative electronic mass airflow sensor circuits of the present invention are shown. The mass airflow sensor circuit is generally depicted by reference numeral 10. The mass airflow sensor circuit 10 includes a sensor 12, an amplifier 14 and a gain/offset configuration 16. The sensor 12 generally includes a balanced bridge configuration 18, such as a wheatstone bridge or other similar configurations well known in the art.

The bridge 18 is comprised of primary and secondary sensor elements 22,24. As previously mentioned, the primary and secondary sensor elements 22,24 are suspended within the metallic or plastic housing of the mass airflow sensor and are the key to proper sensor operation. The alternative mass airflow sensor circuit 10 depicted in FIG. 2 differs from that of FIG. 1 primarily in that bridge 18 includes an additional amplifier 20.

To accurately measure air flow, the primary and secondary sensor elements 22,24 must have non-zero TCR's. That is, the primary and secondary sensor elements 22,24 must be temperature sensitive resistors, such as thermistors, hot foil resistors, or other similar resistors well known in the art. In the preferred embodiment, both the primary and secondary sensors 22,24 have positive TCR's. That is, the resistances of the primary and secondary sensor elements 22,24 increase as temperature increases.

Still referring to FIGS. 1 and 2, bridge 18 also includes a thick film resistor 26. Thick film resistor 26 is electrically connected to secondary element 24 to form a combination element 28. As shown in FIGS. 1 and 2, thick film resistor 26 is preferably connected in series with secondary element 24. The mass airflow sensor circuit 10 of FIGS. 1 and 2 differs from prior art mass airflow sensor circuits through the sizing and use of thick film resistor 26.

As will be described in greater detail in connection with the operation of the mass airflow sensor circuit 10 manufactured by the method of the present invention, thick film resistor 26 must have a substantially zero TCR. That is, the resistance of thick film resistor 26 must not be substantially altered by changes in temperature.

Operation Of The Circuit

Figure 3:
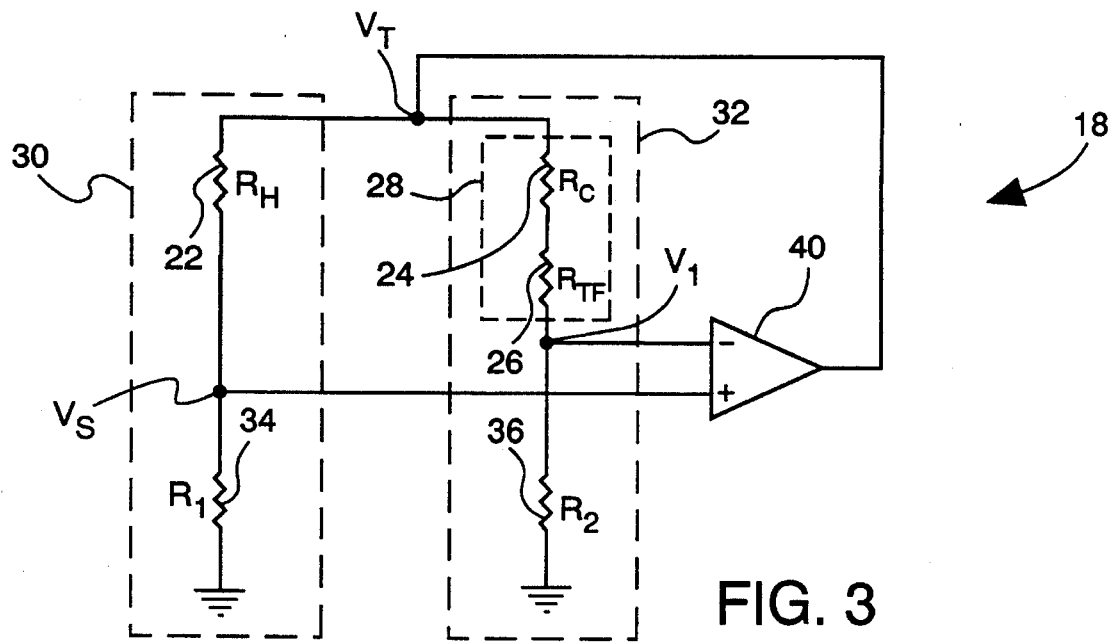
FIG. 3 is a simplified schematic diagram of the electronic mass airflow sensor circuit of FIG. 1.

Referring now to FIG. 3, a simplified schematic diagram of the mass airflow circuit 10 of Figure i is shown. The simplified schematic depicts generally the balanced bridge configuration 18. Bridge 18 comprises first and second legs 30,32. First leg 30 includes primary sensor element 22 and resistor 34. Second leg 32 includes secondary sensor element 24 and thick film resistor 26, as well as resistor 36. As shown in FIG. 3, secondary sensor element 24 and thick film resistor 26 are preferably connected in series to form a combination element 28. Bridge 18 also includes an operational amplifier 40.

During operation of the mass airflow sensor, primary sensor element 22 functions at an elevated temperature. As a result, primary sensor element 22 is also referred to as the "hot" element and is shown having a resistance value of $R_H$. In contrast, secondary sensor element 24 functions at ambient air temperature during operation of the mass airflow sensor. As a result, secondary sensor element 24 is referred to as the "ambient" or "cold" element and is shown having a resistance value of $R_C$. Thick film resistor 26 and resistors 34,36 are shown having resistance values $R_{TF}$, $R_1$ and $R_2$, respectively.

As previously described, in operation the primary and secondary sensor elements 22,24 are suspended within the metallic or plastic housing of the mass airflow sensor in order to be exposed to air flow therethrough. The primary sensor element 22 is also positioned upstream and vertically offset from the secondary sensor element 24. This orientation ensures that the secondary sensor element 24 is exposed to only ambient temperature air, not heated air coming off the primary sensor element 22 which would cause inaccurate air flow measurement.

Referring once again to FIG. 3, the voltage at the top of the bridge 18 is designated as $V_T$. In operation, the bridge 18 balances the voltage drop from $V_T$ across the first and second legs 30,32 of the bridge 18. In a balanced state, the voltage drop, $V_S$, across resistor 34 is equal to the voltage drop, $V_1$, across resistor 36. Accordingly, the voltage drop across the primary sensor element 22 is also equal to the voltage drop across the combination element 28.

Therefore, as is readily apparent and well known in the art, in a balanced state the ratio of the voltage drop across the primary element 22 to the voltage drop across resistor 34 also equals the ratio of the voltage drop across the combination element 28 to the voltage drop across resistor 36. Accordingly, since the current flow through the primary sensor element 22 is equal to the current flow through resistor 34, and the current flow through the combination element 28 is equal to the current flow through resistor 36, it follows that the ratio of the resistance, $R_H$, of the primary sensor element 22 to the resistance, $R_1$, of resistor 34, is equal to the ratio of the resistance, $R_C+R_{TF}$, of the combination element 28 to the resistance, $R_2$, of resistor 36, by virtue of the equation V=IR.

Since the resistance values, $R_1$ and $R_2$, of resistors 34 and 36 remain constant, the resistance ratio of the primary sensor element 22 and the combination element 28 is dictated by the temperature dependant resistance values of $R_H$ and $R_C$, as well as the resistance value assigned to $R_{TF}$. As will be described in greater detail in the discussion of the method of manufacture of the present invention, it is this ratio that is calibrated by sizing of the thick film resistor 26 via laser trimming to allow voltage balancing by bridge 18 to accurately reflect and measure air flow to the engine.

In operation, as air flow across the primary sensor element 22 increases in volume, the elevated operating temperature of the primary sensor element 22 begins to decrease. As the primary sensor element 22 cools, its resistance decreases by virtue of its positive TCR. As the resistance of the primary sensor element 22 decreases, the voltage drop across the primary sensor element 22 also decreases by virtue of the fact that voltage is directly proportional to resistance according to the equation V=IR.

Since the sum of the voltage drops across the primary sensor element 22 and resistor 34 must equal $V_T$, as the voltage across the primary sensor element 22 decreases, the voltage, $V_S$, across resistor 34 increases. Thus, as the volume of air flow increases, the voltage $V_S$ also increases. It is the voltage $V_S$ that is monitored to measure the volume of air flowing to the engine.

As shown in FIG. 3, the voltage $V_S$ is received by the non-inverting terminal of operational amplifier 40. As $V_S$ increases and exceeds $V_1$, the output terminal of the operational amplifier generates a signal to increase $V_T$, the voltage at the top of bridge 18. The voltages $V_S$ and $V_1$ are thereby brought back into balance.

Still referring to FIG. 3, as the temperature of the ambient air flowing across the secondary element 24 increases, the resistance of the secondary sensor element 24 increases by virtue of its positive TCR. In prior art mass airflow sensors, where thick film resistor 26 is not used for calibration purposes, if deviations in the TCR's and resistance ratios of the primary and secondary sensor elements 22,24 are not minimized through proper matching manually, air flow measurement is inaccurate. For example, if the resistance of the secondary sensor element 24 increases too dramatically, by virtue of the operation of the balanced bridge configuration previously described, the voltage $V_1$ will decrease too dramatically and the voltage $V_S$ will be balanced to a level that does not accurately reflect actual air flow to the engine.

In the mass airflow sensor manufactured by the method of the present invention, however, thick film resistor 26, connected in series with secondary sensor element 24 to form combination element 28, is subsequently sized via laser trimming. As previously described, thick film resistor 26 has a substantially zero TCR. As a result, properly sized, thick film resistor 26 compensates for the TCR of the secondary sensor element 24. The TCR of the combination element 28 is thereby adjusted to properly match the TCR of the primary sensor element 22, thus providing for accurate air flow measurement. Moreover, properly sized, thick film resistor 26 also adjusts the resistance ratios of the primary sensor element 22 and the combination element 28 at selected ambient temperatures to again provide for accurate air flow measurement.

Figure 4:
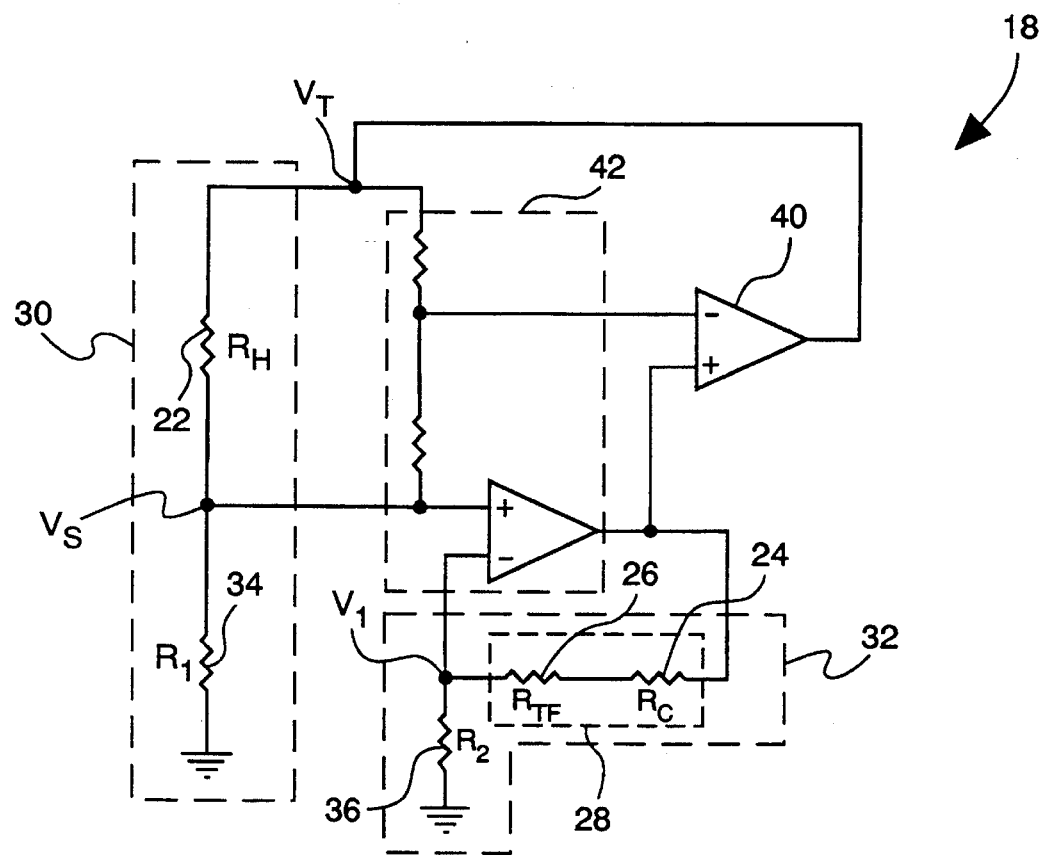
FIG. 4 is a simplified schematic diagram of the alternative electronic mass airflow sensor circuit of FIG. 2.

Referring now to FIG. 4, a simplified schematic diagram of the mass airflow sensor circuit 10 of FIG. 2 is shown. Once again, the simplified schematic depicts generally the balanced bridge configuration 18. Bridge 18 again comprises first and second legs 30,32. First leg 30 includes primary sensor element 22 and resistor 34. Second leg 32 includes secondary sensor element 24 and thick film resistor 26, as well as resistor 36. As shown in FIG. 4, secondary sensor element 24 and thick film resistor 26 are again preferably connected in series to form a combination element 28. Bridge 18 also includes operational amplifier 40. The simplified schematic depicted in FIG. 4 differs from that of FIG. 3 primarily in that bridge 18 includes an additional amplifier 42.

With the exception of the additional amplifier 42, the bridge 18 shown in the simplified schematic diagram of FIG. 4 operates essentially the same as the bridge 18 shown in the simplified schematic diagram of FIG. 3. As amplifier 42 comprises an ordinary operational amplifier well known in the art, a detailed discussion of the operation of the bridge 18 depicted in FIG. 4 is omitted.

However, it should be noted that, to obtain the resistance ratio requirements previously discussed, the design of the bridge 18 shown in FIG. 4 also requires the resistance values of the primary sensor element 22 and the combination element 28 to be matched. In prior art mass airflow sensors, where thick film resistor 26 is not used for calibration purposes, the resistance values of the primary and secondary sensor elements 22,24 must therefore be precisely matched. The connection of thick film resistor 26 in series with the secondary sensor element 24 to form combination element 28 allows the resistance values of the primary and secondary sensor elements 22,24 to vary more widely without loss of air flow measurement accuracy. Thick film resistor 26 compensates for $R_C$, the resistance of the secondary sensor element 24. The resistance, $R_C+R_{TF}$, of the combination element 28 is thereby adjusted to the resistance, $R_H$, of the primary sensor element 22 thus providing for accurate air flow measurement.

Method Of Manufacture

According to the operation of the mass airflow sensor circuitry previously described, for sensors manufactured by the prior art method to properly measure air flow, primary and secondary sensor elements 22,24 must have TCR's that do not deviate from each other by more than 1%. Additionally, differences in the resistance ratios of the primary and secondary sensor elements 22,24 at selected ambient temperatures must be minimized. In the mass airflow sensor circuit 10 depicted in FIG. 2, to properly minimize such resistance ratio differences, the primary and secondary sensor elements 22,24 must have resistance values between 19.5 and 20.5 ohms at room temperature, and those resistance values must not deviate from each other by more than 0.1 ohm.

As previously mentioned, these requirements can be met by matching of the sensor elements. In the manufacture of prior art sensors, matching is accomplished by manually sorting pre-tested elements into groups, where each group contains elements having TCR's and resistances meeting the above described requirements. To have properly matched elements, each sensor is then constructed using only elements from the same group. This method of manufacture requires high quality control of pre-tested elements for resistance values, and labor intensive efforts for sorting of elements.

In the following description of the method of manufacturing a mass airflow sensor of the present invention, it should be noted that air flow across the primary and secondary sensor elements 22,24 is held constant. Engine idle conditions are preferably chosen for constant air flow. However, ambient air temperatures are varied as described below.

Figure 5:
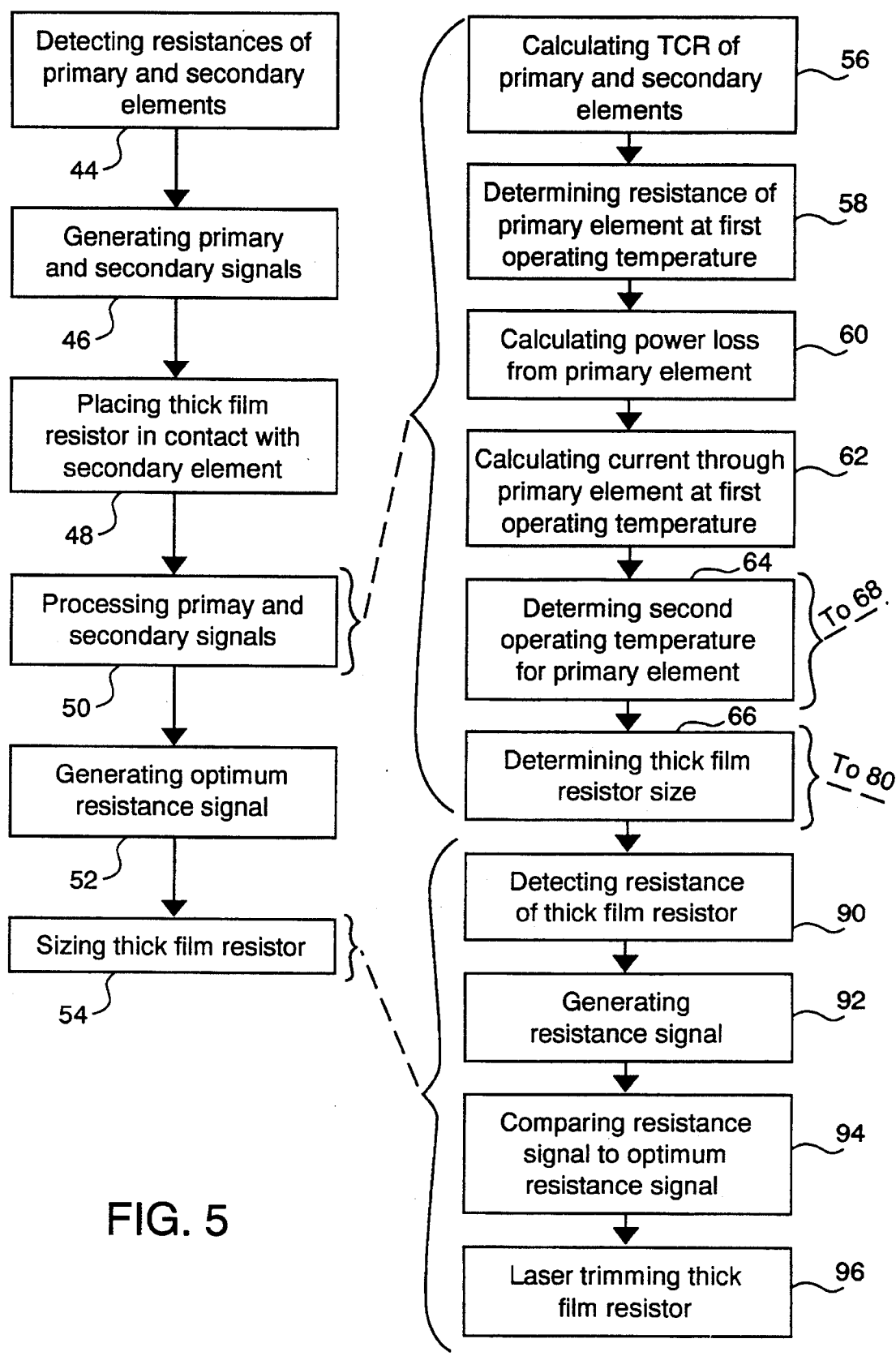
FIG. 5 is a partial block diagram of the method for manufacturing an electronic mass airflow sensor circuit in accordance with the present invention.

Referring now to FIGS. 3 and 5, the method begins with the step of detecting 44 the resistances of the primary and secondary sensor elements 22,24 at first and second selected temperatures. For manufacturing ease, the first and second selected temperatures, respectively, are preferably room temperature and a temperature between 85°–100° C., such as 90° C. However, the first and second selected temperatures may be chosen otherwise.

Primary and secondary electrical signals are then generated 46 corresponding to the detected resistances of the primary and secondary sensor elements 22,24 at the first and second selected temperatures. The thick film resistor 26 is then placed 48 in electrical contact with the secondary sensor element 24 to form the combination element 28. As previously mentioned, the thick film resistor 26 is preferably connected in series with the secondary sensor element 24.

The method continues by processing 50 the primary and secondary electrical signals to determine primary sensor element 22 operating temperatures at first and second selected ambient air temperatures such that the current through the primary sensor element 22 remains constant. Current through the primary sensor element 22 must remain constant because this current determines the voltage drop, $V_S$, across resistor 34 which is the voltage monitored to measure air flow. Since air flow is being held constant, voltage $V_S$ should likewise remain constant. The first and second selected ambient air temperatures are chosen from the temperature range of engine operation, −30° C. to 110° C. For optimum operation of the mass airflow sensor circuitry, the first and second selected ambient temperatures are preferably 10° C. and 70° C., respectively.

The processing 50 step also determines an optimum resistance for the thick film resistor 26 such that i) deviations in the TCR's of the primary sensor element 22 and the combination element 28 are minimize; and ii) deviations in the resistance ratios of the primary sensor element 22 and combination element 28 at the first and second selected ambient temperatures are minimized, thus ensuring accurate air flow measurement.

Next, an optimum resistance signal is generated 52 corresponding to the optimum resistance determined for the thick film resistor 26 during the processing 50 step. Finally, the thick film resistor 26 is properly sized 54 based upon the optimum resistance signal.

The step of processing 50 includes a number of additional steps. First, the TCR of the primary and secondary sensor elements 22,24 are calculated 56. This is accomplished by plotting the resistance of the primary and secondary sensor elements 22,24 as a function of temperature based upon the primary and secondary electrical signals. From this the resistance of the primary sensor element 22 is determined 58 at a first selected operating temperature. The first selected operating temperature preferably exceeds the first selected ambient temperature by 200° C., but may be chosen otherwise. In the present method, therefore, the first selected operating temperature is preferably 210° C.

Next, power losses associated with the operation of the primary sensor element 22 due to convection, conduction, and radiation are calculated 60 at the first selected ambient temperature and first selected operating temperature. Power losses are based on the difference between the first selected operating temperature and the first selected ambient temperature, as well as well known thermodynamic principles of hot wire anemometry sensitive to primary sensor element 22 geometry. As a result, the dimensions of the primary sensor element 22 must also be determined 61.

Once power and resistance are known, current through the primary sensor element 22 at the first selected ambient temperature and first selected operating temperature is calculated 62 according to the formula $P=I^2R$. A second operating temperature for the primary sensor element 22 is then determined 64 at the second selected ambient temperature such that current through the primary sensor element 22 remains constant as air flow across the primary sensor element 22 is held at a selected constant volume.

Additionally, the size of the thick film resistor 26 is determined 66 necessary to provide the thick film resistor 26 with the optimum resistance value such that deviations in the TCR's of the primary sensor element 22 and the combination element 28 are minimized. The size of the thick film resistor 26 is also determined 66 to provide the thick film resistor 26 with the optimum resistance value such that deviations in the resistance ratios of the primary sensor element 22 and the combination element 28 at the first and second selected ambient temperatures are minimized.

Figure 6:
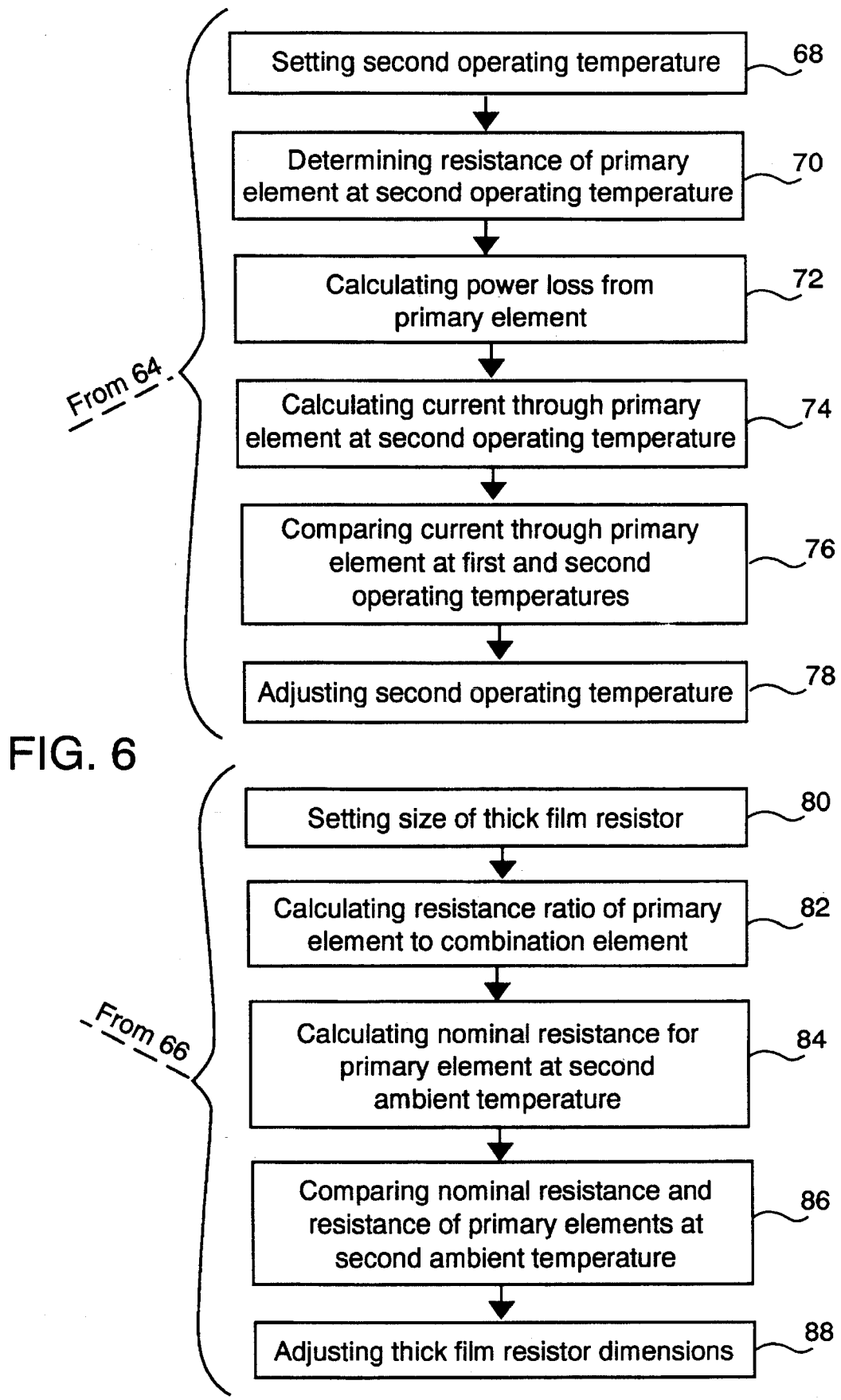
FIG. 6 is a partial block diagram of the method for manufacturing an electronic mass airflow sensor circuit in accordance with the present invention.

Referring next to FIG. 6, the step of determining 64 a second operating temperature for the primary sensor element 22 at the second selected ambient temperature also includes additional steps, which together form an iterative process. First, the second operating temperature is set 68 at a temperature greater than the first selected operating temperature. The resistance of the primary sensor element 22 at such an operating temperature is then determined 70 based on the previously plotted TCR for the primary sensor element 22.

Once again, power losses associated with the operation of the primary sensor element 22 at the second operating temperature and second selected ambient temperature are calculated 72. Such power losses are again based on the difference between the second operating temperature and the second selected ambient temperature, as well as well known thermodynamic principles of hot wire anemometry sensitive to primary sensor element 22 geometry. As a result, the dimensions of the primary sensor element 22 must also be determined 61.

Next, current through the primary sensor element 22 at the second selected ambient temperature and second operating temperature is calculated 74 based on primary sensor element 22 resistance and power loss. The current through the primary sensor element 22 at the second operating temperature and second selected ambient temperature is then compared 76 to the current through the primary sensor element 22 at the first selected operating temperature and first selected ambient temperature.

If the previously described current values are not equal, the second operating temperature is adjusted 78 by a selected value and the steps included in determining 64 a second operating temperature for the primary sensor element 22 at the second operating temperature are repeated. As is readily apparent, this iterative process continues until such previously described current values are equal. As previously discussed, current through the primary sensor element 22 must remain constant because this current determines the voltage drop, $V_S$, across resistor 34 which is the voltage monitored to measure air flow. Since air flow is being held constant, voltage $V_S$ should likewise remain constant.

Still referring to FIG. 6, the step of determining 66 the size of the thick film resistor 26 also includes additional steps, which form a second iterative process. First, the size of the thick film resistor 26 is set 80 when the thick film resistor is painted onto the substrate, normally alumina, that forms part of the mass airflow sensor circuitry. As the resistance of the thick film resistor is substantially dependant on its size, the setting 80 of the size of the thick film resistor 26 generally dictates its initial resistance value. Moreover, since the TCR of the thick film resistor is substantially zero, the resistance value of the thick film resistor does not substantially vary as a function of temperature.

Next, the resistance ratio of the primary sensor element 22 to the combination element 28 at the first selected ambient temperature is calculated 82. As is well known in the art and readily apparent from the operation of the mass airflow sensor circuit previously discussed, the ratio of the resistance, $R_H$, of the primary sensor element 22 to the resistance, $R_C+R_{TF}$, of the combination element 28 is a constant. This ratio is mathematically depicted as $R_H=K(R_C+R_{TF})$.

The resistance values, $R_H$ and $R_C$, of the primary and secondary sensor elements 22,24 are known at the first selected ambient temperature based upon the TCR's of the primary and secondary sensor elements 22,24. As discussed above, the resistance, $R_{TF}$, of the thick film resistor 26 is also known. From these known resistances K, the resistance ratio of the primary sensor element 22 to the combination element 28 at the first selected ambient temperature, is calculated 82.

A nominal resistance value for the primary sensor element 22 at the second selected ambient temperature is then calculated 84. The resistance, $R_C$, of the secondary sensor element 24 at the second selected ambient temperature is known based upon the TCR of the secondary sensor element 24. As previously discussed, the resistance, $R_{TF}$, of the thick film resistor 26 is also known and the constant value of the resistance ratio, K, has been calculated 82. Thus, the nominal resistance of the primary sensor element 22 at the second selected ambient temperature is calculated 84 based upon the previous equation, $R_H=K(R_C+R_{TF})$.

Next, the nominal resistance of the primary sensor element 22 at the second selected ambient temperature is compared 86 to the actual resistance of the primary sensor element 22 at the second selected ambient temperature as determined by the TCR of the primary sensor element 22. If these values are not equal, the size of the thick film resistor 26 is adjusted 88 by a selected value and the steps included in determining 66 the size of the thick film resistor 26 are repeated.

As is readily apparent, this iterative process continues until the size of the thick film resistor 26 is determined 66 such that i) deviations in the TCR's of the primary sensor element 22 and the combination element 28 are minimized; and ii) deviations in the resistance ratios of the primary sensor element 22 and the combination element 28 at the first and second selected ambient temperatures are minimized.

The just described second iterative process is adequate for determining 66 the size of the thick film resistor 26 in either of the improved mass airflow sensor circuits depicted in FIGS. 1 or 2. However, it should be noted that with the simple bridge configuration 18 of the circuit shown in FIG. 1, determining 66 the size of the thick film resistor 26 can also be done empirically.

Specifically, as previously described, the resistance values, $R_H$ and $R_C$, of the primary and secondary sensor elements 22,24 are known at both the first and second selected ambient temperatures. Moreover, as also previously described, the ratio of the resistance, $R_H$, of the primary sensor element 22 to the resistance, $R_C+R_{TF}$, of the combination element 28 must remain constant to ensure proper sensor operation. Therefore, such ratios at the first and second selected ambient temperatures can be equated where the only unknown quantity is the resistance, $R_{TF}$, of the thick film resistor 26. The size of the thick film resistor 26 is then determined 66 simply by solving such an equation for the unknown resistance, $R_{TF}$, of the thick film resistor 26.

In a similar fashion, the resistance values, $R_1$ and $R_2$, of the resistor 34,36 of FIG. 4 may also be empirically determined once the resistance, $R_{TF}$, Of the thick film resistor 26 is known. In contrast, the more complex bridge configuration 18 of FIG. 2 does not lend itself to such an empirical determination 66 of the size of the thick film resistor 26. Consequently, the second iterative process previously described must be employed.

As previously discussed, deviations between such TCR's and resistance ratios must be minimized in order to accurately measure air flow. Thick film resistor 26 has a TCR of approximately zero. As a result, the TCR variation of the secondary sensor element 24 over temperature is adjusted by the thick film resistor 26 connected in series with the secondary sensor element 24.

Referring again to FIG. 5, the step of sizing 54 the thick film resistor 26 also includes additional steps. First, the resistance of the thick film resistor 26 is detected 90 and a resistance signal is generated 92 corresponding thereto.

Next, the resistance signal is compared 94 to the optimum resistance signal previously generated 52. If these signals are not equal, the thick film resistor 26 is then conveniently laser trimmed 96 to the appropriate size and shape such that the resistance signal equals the optimum resistance signal. Once again, such trimming 96 serves to minimize deviations in the TCR's and ambient resistance ratios of the primary sensor element 22 and the combination element 28, and maintain current flow through the primary sensor element 22 at a constant value for a constant volume of air flow.

The method for manufacturing a mass airflow sensor of the present invention allows the primary and secondary sensor elements 22,24 to have TCR's that differ from each other by as much as 6%. Additionally, in the mass airflow sensor circuit 10 depicted in FIG. 2, the primary and secondary sensor elements 22,24 may each have resistance values varying from 18 to 22 ohms at room temperature.

The laser trimmed thick film resistor 26 connected in series with the secondary sensor element 24 thus serves to adjust the secondary sensor element 24 to the primary sensor element 22. In so doing, the method significantly reduces costly quality control requirements and labor intensive sorting associated with prior art methods. Additionally, the TCR's and ambient resistance ratios of the primary and secondary sensor elements 22,24 can be precisely adjusted by the method of the present invention. As a result, mass airflow sensors manufactured by this method also function better than conventionally matched sensors over the temperature range of ambient air flowing to an engine.

It is to be understood that the present invention has been described in an illustrative manner and the terminology which has been used is intended to be in the nature of words of description rather than limitation. Obviously, many modifications and variations of the present invention are possible in light of the above teachings. Therefore, it is to be understood that, within the scope of the following claims, the invention may be practiced otherwise than as specifically described.

I claim:

1. A method for manufacturing a mass airflow sensor for use with primary and secondary sensor elements having non-zero temperature coefficients of resistance, and a thick film resistor having a substantially zero temperature coefficient of resistance, the method comprising the steps of:

detecting the resistance of the primary and secondary sensor elements at first and second selected temperatures respectively;

generating primary and secondary electrical signals corresponding to the detected resistance of the primary and secondary sensor elements at the first and second selected temperatures;

placing the thick film resistor in electrical contact with the secondary sensor element to form a combination element having a non-zero temperature coefficient of resistance;

processing the primary and secondary electrical signals to determine primary sensor element operating temperatures at first and second selected ambient temperatures and to determine an optimum resistance of the thick film resistor such that current through the primary sensor element remains constant for a selected constant volume of air flow, deviations in the temperature coefficients of resistance of the primary sensor element and combination element are minimized, and deviations in resistance ratios of the primary sensor element and combination element at the first and second selected ambient temperatures are minimized; and sizing the thick film resistor in accordance with the optimum resistance.

2. A method for manufacturing a mass airflow sensor for use with primary and secondary sensor elements having non-zero temperature coefficients of resistance, and a thick film resistor having a substantially zero temperature coefficient of resistance, the method comprising the steps of:

detecting the resistance of the primary and secondary sensor elements at first and second selected temperatures respectively;

generating primary and secondary electrical signals corresponding to the detected resistance of the primary and secondary sensor elements at the first and second selected temperatures;

placing the thick film resistor in electrical contact with the secondary sensor element to form a combination element having a non-zero temperature coefficient of resistance;

processing the primary and secondary electrical signals to determine primary sensor element operating temperatures at first and second selected ambient temperatures and to determine an optimum resistance of the thick film resistor such that current through the primary sensor element remains constant for a selected constant volume of air flow, deviations in the temperature coefficients of resistance of the primary sensor element and combination element are minimized, and deviations in resistance ratios of the primary sensor element and combination element at the first and second selected ambient temperatures are minimized;

generating an optimum resistance signal corresponding to the optimum resistance determined for the thick film resistor; and sizing the thick film resistor in response to the optimum resistance signal.

3. A method for manufacturing a mass airflow sensor as in claim 2 wherein the step of processing includes the further steps of:

calculating the temperature coefficients of resistance of the primary and secondary sensor elements;

determining the resistance of the primary element at a first selected operating temperature;

calculating power losses from the primary element at the first selected operating temperature and the first selected ambient temperature;

calculating current through the primary element at the first selected operating temperature and the first selected ambient temperature;

determining a second operating temperature for the primary sensor element at the second selected ambient temperature such that current through the primary sensor element remains constant for a selected constant volume of air flow;

determining the thick film resistor size necessary to provide the thick film resistor with the optimum resistance such that deviations in the temperature coefficients of resistance of the primary sensor element and the combination element are minimized, and such that deviations in the resistance ratios of the primary sensor element and combination element at the first and second selected ambient temperatures are minimized.

4. A method for manufacturing a mass airflow sensor as in claim 3 further including the step of determining the dimensions of the primary element.

5. A method for manufacturing a mass airflow sensor as in claim 3 wherein the step of determining a second operating temperature for the primary sensor element at the second selected ambient temperature includes the further steps of:

setting the second operating temperature at a temperature greater than the first selected operating temperature;

determining the resistance of the primary sensor element at the second operating temperature;

calculating power losses from the primary sensor element at the second operating temperature and the second selected ambient temperature;

calculating current through the primary sensor element at the second operating temperature and the second selected ambient temperature;

comparing the current through the primary sensor element at the second operating temperature and the second selected ambient temperature to the current through the primary sensor element at the first selected operating temperature and the first selected ambient temperature; and adjusting the second operating temperature by a selected value when current through the primary sensor element at the second operating temperature and the second selected ambient temperature is unequal to the current through the primary sensor element at the first selected operating temperature and the first selected ambient temperature.

6. A method for manufacturing a mass airflow sensor as in claim 3 wherein the step of determining the thick film resistor size includes the further steps of:

setting the size of the thick film resistor at selected dimensions;

calculating the resistance ratio of the primary sensor element to the combination element at the first selected ambient temperature;

calculating a nominal resistance value for the primary sensor element at the second selected ambient temperature;

comparing the nominal resistance value for the primary sensor element at the second selected ambient temperature to the resistance value for the primary sensor element at the second selected ambient temperature;

adjusting the dimensions of the thick film resistor by a selected value when the nominal resistance value for the primary sensor element at the second selected ambient temperature in unequal to the resistance value for the primary sensor element at the second selected ambient temperature.

7. A method for manufacturing a mass airflow sensor as in claim 2 wherein said step of sizing includes the further step of:

detecting the resistance of the thick film resistor;

generating a resistance signal corresponding to the detected resistance of the thick film resistor;

comparing the resistance signal to the optimum resistance signal; and laser trimming the thick film resistor when the resistance signal is unequal to the optimum resistance signal such that the thick film resistor minimizes deviations in the temperature coefficients of resistance of the primary sensor element and the combination element, minimizes deviations in the resistance ratios of the primary sensor element and combination element at the first and second selected ambient temperatures, and maintains the current through the primary element at a constant value for a selected constant volume of air flow.

8. A method for manufacturing a mass airflow sensor for use with primary and secondary sensor elements having non-zero temperature coefficients of resistance, and a thick film resistor having a substantially zero temperature coefficient of resistance, the method comprising the steps of:

detecting the resistance of the primary and secondary sensor elements at first and second selected temperatures respectively;

generating primary and secondary electrical signals corresponding to the detected resistance of the primary and secondary sensor elements at the first and second selected temperatures;

placing the thick film resistor in electrical contact with the secondary sensor element to form a combination element having a non-zero temperature coefficient of resistance;

processing the primary and secondary electrical signals to determine primary sensor element operating temperatures at first and second selected ambient temperatures and to determine an optimum resistance of the thick film resistor such that current through the primary sensor element remains constant for a selected constant volume of air flow, deviations in the temperature coefficients of resistance of the primary sensor element and combination element are minimized, and deviations in resistance ratios of the primary sensor element and combination element at the first and second selected ambient temperatures are minimized; and generating an optimum resistance signal corresponding to the determined optimum resistance for the thick film resistor;

detecting the resistance of the thick film resistor;

generating a resistance signal corresponding to the detected resistance of the thick film resistor;

comparing the resistance signal to the optimum resistance signal; and laser trimming the thick film resistor when the resistance signal is unequal to the optimum resistance signal.

\* \* \* \* \*